United States Patent
Hetzler et al.

(10) Patent No.: US 7,702,853 B2
(45) Date of Patent: *Apr. 20, 2010

(54) DATA STORAGE SYSTEM WITH POWER MANAGEMENT CONTROL AND METHOD

(75) Inventors: Steven R. Hetzler, Los Altos, CA (US); Daniel F. Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 11/744,283

(22) Filed: May 4, 2007

(65) Prior Publication Data

US 2008/0276042 A1 Nov. 6, 2008

(51) Int. Cl.
G06F 12/00 (2006.01)

(52) U.S. Cl. .................................. 711/114; 713/320

(58) Field of Classification Search .................. 711/114; 713/324

See application file for complete search history.

(56) References Cited

U.S. PATENT DOCUMENTS

| | | | | |
|---|---|---|---|---|
| 6,067,635 | A * | 5/2000 | DeKoning et al. | 714/6 |
| 6,823,349 | B1 * | 11/2004 | Taylor et al. | 707/204 |
| 6,961,815 | B2 * | 11/2005 | Kistler et al. | 711/114 |
| 7,194,675 | B2 * | 3/2007 | Kawamura et al. | 714/798 |
| 7,210,005 | B2 * | 4/2007 | Guha et al. | 711/114 |
| 7,516,346 | B2 * | 4/2009 | Pinheiro et al. | 713/324 |
| 7,536,588 | B2 * | 5/2009 | Hafner et al. | 714/6 |
| 2003/0005354 | A1 * | 1/2003 | Kalman | 714/7 |
| 2003/0149840 | A1 * | 8/2003 | Bolt et al. | 711/114 |
| 2005/0015700 | A1 * | 1/2005 | Hetzler et al. | 714/766 |
| 2005/0108582 | A1 | 5/2005 | Fung | |
| 2005/0138284 | A1 | 6/2005 | Cohn et al. | |
| 2005/0160221 | A1 | 7/2005 | Yamazaki et al. | |
| 2005/0268119 | A9 | 12/2005 | Guha et al. | |
| 2005/0289361 | A1 | 12/2005 | Sutardja | |
| 2007/0162692 | A1 * | 7/2007 | Nishimoto et al. | 711/113 |
| 2008/0151724 | A1 * | 6/2008 | Anderson et al. | 369/53.42 |
| 2009/0249104 | A1 * | 10/2009 | Ikeda et al. | 713/324 |

OTHER PUBLICATIONS

Pinheiro, E. etal., "Energy Conservation Techniques for Disk Array-Based Servers", Proceeding of the 18th International conference on Supercomputing (ICS' 04), Jun. 2004.*

(Continued)

*Primary Examiner*—Brian R Peugh
*Assistant Examiner*—Sam Chen
(74) *Attorney, Agent, or Firm*—Gibb I.P. Law Firm, LLC (57) ABSTRACT

Disclosed are a redundant data storage system (e.g., a RAID system) and a method of operating such a redundant data storage system that provides significant power savings with minimal reduction in reliability. The system and method allow up to half of the memory devices in any of the memory arrays in the system to be placed in standby without significantly impacting the read accesses. The system and method further designate reserved areas in the active memory devices as write-journals, which have at least the same level of protection as the main arrays. The write-journals allow data to be written without powering up a standby memory device. Thus, power consumption is minimized without impacting reliability.

3 Claims, 6 Drawing Sheets

OTHER PUBLICATIONS

E. Pinheiro, R. bianchini and C. Dubnicki. "Exploiting Redundancy to conserve Energy in Storage Systems", In SIGMETRICS'06, Jun. 2006.*

E. Carrera, E. Pinheiro and R Bianchini, "conserving Disk Energy in Network Servers", In ICS'03, Jun. 2003.*

D. Colarelli and D. Grunwald. "Massive Arrays of Idle Disks for Storage Archives", In ICS'02, Nov. 2002.*

D. Li and J. Wang, "eRAID: A Queueing Model Based Energy Saving Policy", In 14th IEEE International Sysmoposium on Modling, Sep. 2006.*

* cited by examiner

Each Device 1 In Each Storage Unit 111-666 Belongs To Array 10.
Each Device 2 In Each Storage Unit 111-666 Belongs To Array 20.
Each Device 3 In Each Storage Unit 111-666 Belongs To Array 30.
Each Device 4 In Each Storage Unit 111-666 Belongs To Array 40.
Each Device 5 In Each Storage Unit 111-666 Belongs To Array 50.
Each Device 6 In Each Storage Unit 111-666 Belongs To Array 60.

Figure 1

Memory Device

| | 1 | 2 | 3 | 4 | 5 | 6 |
|---|---|---|---|---|---|---|
| 111 | (10) - | (20) - | (30) - | (40) 333,3 | (50) 333,4 | (60) 333,5 |
| 222 | (10) 444,6 | (20) - | (30) - | (40) - | (50) 444,4 | (60) 444,5 |
| 333 | (10) 555,6 | (20) 555,1 | (30) - | (40) - | (50) - | (60) 555,5 |
| 444 | (10) 666,6 | (20) 666,1 | (30) 666,2 | (40) - | (50) - | (60) - |
| 555 | (10) - | (20) 111,1 | (30) 111,2 | (40) 111,3 | (50) - | (60) - |
| 666 | (10) - | (20) - | (30) 222,2 | (40) 222,3 | (50) 222,4 | (60) - |

Storage Unit

The parentheses ( ) refer to the array number of the device. The dash – indicates that the device is on standby. The pair of numbers (e.g., 444,6) indicates that the device is active and contains a write journal for the standby device (second number) in the referenced storage unit number (first number).

Figure 2

Memory Device

| | 1 | 2 | 3 | 4 | 5 | 6 |
|---|---|---|---|---|---|---|
| 111 | (10) - | (20) - | (30) - | (40) 111,1 | (50) 111,2 | (60) 111,3 |
| 222 | (10) 222,2 | (20) - | (30) - | (40) - | (50) 222,3 | (60) 222,4 |
| 333 | (10) 333,3 | (20) 333,4 | (30) - | (40) - | (50) - | (60) 333,5 |
| 444 | (10) 444,4 | (20) 444,5 | (30) 444,6 | (40) - | (50) - | (60) - |
| 555 | (10) - | (20) 555,6 | (30) 555,1 | (40) 555,5 | (50) - | (60) - |
| 666 | (10) - | (20) - | (30) 666,2 | (40) 666,6 | (50) 666,1 | (60) - |

Storage Unit

The parentheses ( ) refer to the array number of the device. The dash – indicates that the device is on standby. The pair of numbers (e.g., 444,6) indicates that the device is active and contains a write journal for the standby device (second number) in the referenced storage unit number (first number).

Figure 3

Memory Device

| Storage Unit | 1 | 2 | 3 | 4 | 5 | 6 |
|---|---|---|---|---|---|---|
| 111 | (10) - | (20) - | (30) - | (40) - | (50) - | (60) - |
| 222 | (10) - | (20) - | (30) - | (40) - | (50) - | (60) - |
| 333 | (10) - | (20) - | (3)0 - | (40) - | (50) - | (60) - |
| 444 [11, 44] | (10) 222,4 | (20) 333,5 | (30)111,6 | (40) 222,1 | (50) 333,2 | (60) 111,3 |
| 555 [22, 55] | (10) 222,5 | (20) 333,6 | (30) 111,4 | (40) 222,2 | (50) 333,3 | (60) 111,1 |
| 666 [33, 66] | (10) 222,6 | (20) 333,4 | (30) 111,5 | (40) 222,3 | (50) 333,1 | (60) 111,2 |

The parentheses ( ) refer to the array number of the device. The dash – indicates that the device is on standby. The pair of numbers (e.g., 444,6) indicates that the device is active and contains a write journal for the standby device (second number) in the referenced storage unit number (first number).

DATA STORAGE SYSTEM WITH POWER MANAGEMENT CONTROL AND METHOD

BACKGROUND

1. Field of the Invention

The embodiments of the invention generally relate to data storage systems, and, more particularly, to power consumption management for data storage systems.

2. Description of the Related Art

Power consumption is a major issue for large storage systems, and important in general. Currently, users must suffer a loss of performance to achieve significant power savings in a storage array by powering down disks (i.e., placing them in standby). If an input/output (IO) request requires access to a disk that is in standby (i.e., powered down), there may be a substantial delay (e.g., up to or exceeding 10 seconds) before the disk becomes operational. In redundant array of independent disks (RAID) systems (e.g., as illustrated in U.S. patent application Ser. No. 10/619,648 of Hetzler et al., filed on Jul. 14, 2003, and incorporated herein by reference) the redundancy provides an opportunity to at least maintain read access by powering down a fraction of the disks equal to the redundancy. However, in high efficiency arrays, such as RAID 5 or RAID 6, the redundancy is insufficient to provide significant power savings and still guarantee read access, for example, 1 disk out 8 in a 7+P RAID 5. Additionally, since writes still require the disk to be active (i.e., powered up), this rate of power savings can be easily lost during the power-up process if disks are placed in standby too often.

SUMMARY

In view of the foregoing, disclosed herein are embodiments of an improved redundant data storage system (e.g., a symmetric redundant array of independent disks (RAID) system) and a method of operating such a redundant data storage system that provides significant power savings with minimal reduction in reliability. The system and method allow up to half of the memory devices in any of the memory arrays in the system to be placed in standby without significantly impacting the read accesses. The system and method further designate reserved areas in the active memory devices as write-journals, which have at least the same level of protection as the main arrays. The write-journals allow data to be written without powering up a standby memory device. Thus, power consumption is minimized with minimal impact on reliability.

More particularly, disclosed herein are embodiments of a redundant data storage system that comprises a plurality of arrays of memory devices. The memory devices typically comprise hard disk drives (HDDs), but may also comprise other devices, for example, random access memory (RAM) devices, optical storage devices, magnetic tape storage devices, etc. Each of the memory devices can comprise reserved storage space that is set aside specifically for write-journals.

The system can further comprise at least one controller (e.g., one or more processors) adapted to (e.g., programmed to) control these memory devices. For example, the controller(s) can be adapted to control reads from, writes to, and powering up and powering down of these memory devices. More specifically, the controller(s) can be adapted to selectively control the memory devices such that at any given time up to half of the memory devices in each of the arrays comprise standby memory devices. That is, up to half of the devices are powered down at any given time such that they are in a standby status. All other device (i.e., devices that are powered up) would comprise active memory devices. Devices that are powered up allow both read and write access.

The controller(s) can further be adapted to associate the standby memory devices with corresponding write-journals on different memory devices and, more particularly, on active memory devices. The controller(s) can also be adapted to receive new data; to determine a target storage location for that new data; and, if the target location is one of the standby memory devices, then to write the new data to its corresponding write-journal.

The controller(s) can further be adapted to power up each one of the standby memory devices and transfer new data from their corresponding write-journals to the target location (i.e., to flush the write-journals). Powering up each of the standby memory devices can be periodically, intermittently, conditionally, on-demand, etc. The controller(s) can further be adapted to selectively control powering up and powering down of the memory devices in the different memory arrays to allow for uniform aging.

The above-described system features can be implemented, for example, in a symmetric redundant data storage system (e.g., a symmetric redundant array of independent disks (a symmetric RAID)). That is, each of the memory arrays can comprise a same number n of memory devices (e.g., four, six, eight, etc.). Additionally, the system can comprise a plurality of storage units (e.g., boxes) and each of these storage units can comprise one controller as well as one memory device from each of the different memory arrays. The controller in each storage unit can be in communication with all of the memory devices in that storage unit as well as to an interface. This interface can be adapted to allow communication between any one of the controllers and any of the memory devices in any of the storage units (i.e., to provide a distributed network of controllers). Thus, for example, any one controller in any one storage unit can be adapted to control all of the memory devices in any single array or in multiple arrays.

The redundancy in such a symmetric system can be used to ensure no or minimal impact on the read access to data already stored, even when up to half of the memory devices in any given array at any give time are powered down. That is, even if half of the devices in one, some or all of the memory arrays in the redundant system are placed in standby, any data that was stored redundantly in those memory arrays would still be readable on the remaining active memory devices in those memory arrays.

Additionally, as mentioned above, reserved space for write-journals is provided on each of the memory devices and the controllers are adapted to associate each standby memory device with a corresponding write-journal on another different memory device so that if a target location for newly received data is one of the standby memory devices, then the new data can be written to its corresponding write-journal. The controllers can be adapted to store, access and apply predetermined policies which are used to determine which memory devices are to be powered down (i.e., placed in standby) at any given time and also to associate each standby memory device with one corresponding write-journal on another memory device. These policies are interdependent.

For example, in a symmetric RAID system embodiment, the controllers can be adapted to (e.g., can be programmed to) selectively power up and power down the memory devices such that in each of the storage units up to one half of the memory devices are on standby at any given time. In such a system, a predetermined powering-down policy can provide that memory devices should be powered down on a rotational basis using a pattern (e.g., a diagonal pattern) which ensures that no two storage unit will have memory devices from the same three arrays powered down at the same time. Additionally, a predetermined association policy can provide that the standby memory device and the different memory device on which its corresponding write-journal is located should be in different arrays and controlled by different controllers. Alternatively, the predetermined association policy can provide that each memory array can host no more than one write-journal from any other memory array and that the standby memory device and the different memory device on which its corresponding write-journal is located are contained within the same storage unit and, thus, controlled by the same controller.

In an alternative symmetric RAID system embodiment, the controllers can be adapted to (e.g., can be programmed to) selectively power up and power down entire storage units, including both the memory devices and the controller contained therein, such that half of the storage units and, therefore, half of all the memory devices in each array are on standby at any given time. In such a system, a predetermined powering down policy can provide that the storage units should be powered down on a rotational basis. Additionally, a predetermined association policy can provide that the corresponding write-journals for the standby memory devices in each storage unit that is powered down should be dispersed (e.g., approximately equally) amongst the memory devices in the active storage units and can further provide that each standby memory device and the different memory device on which its corresponding write-journal is located are in different arrays.

Also disclosed are embodiments of a method of managing a data storage system such as the one described above. More specifically, the embodiments of the method comprise selectively controlling memory devices in a plurality of memory arrays such that at any given time up to half of the memory devices are powered down (i.e., comprise standby memory devices) and the remainder are powered up (i.e., to comprise active memory devices). This process of selectively controlling the memory devices can further comprise selectively controlling powering up and powering down of the memory devices to allow for uniform aging.

Additionally, the method comprises reserving storage space for write-journals in each of the memory devices and associating the standby memory devices with corresponding write-journals on different memory devices based on a predetermined policy. This predetermined policy takes into consideration the manner in which up to half of the memory devices in each array are powered down to avoid associating a standby memory device with a write-journal on another standby memory device.

For example, in one method embodiment the redundant storage system being managed can comprise a symmetric RAID system, as discussed above, and the memory devices can be selectively powered up and powered down such that in each storage unit that contains one of the memory devices from each of the arrays up to half of the memory devices are on standby at any given time. With such a method embodiment, each of the standby memory devices should be associated with corresponding write-journals in a manner that ensures that the standby memory devices are in different arrays and controlled by different controllers than the different memory devices which contain the corresponding write-journals. Alternatively, the standby memory devices should be associated with corresponding write-journals in a manner that ensures that the standby memory devices are in the same storage units as the different memory devices which contain the corresponding write-journals and such that each of the memory arrays contain no more than one write-journal from any other memory array.

In another method embodiment, the storage system being managed can similarly comprise a symmetric RAID system, as discussed above, but in this embodiment the storage units which contain one of the memory devices from each of the memory arrays can be selectively powered down such that up to half of the storage units and, thereby, up to half of the memory devices in any given memory array are on standby at any given time. With such a method embodiment, each standby memory device can be associated with one corresponding write-journal on another memory device in such a way that ensures that the corresponding write-journals for the standby memory devices in each storage unit that is powered down are dispersed (e.g., approximately equally) amongst the memory devices in the active storage units and further that each standby memory device and the different memory device on which its corresponding write-journal is located are in different arrays.

Then, as new data is received by the redundant storage system, a target storage location within the storage system for the new data is determined. If the target storage location is one of the standby memory devices, then the new data is written to the corresponding write-journal for that standby memory device. The method embodiments can further comprise periodically, intermittently, on-demand, or conditionally powering up each of the standby memory devices and transferring any new data from the corresponding write-journals to their target storage locations.

Finally, also disclosed is a program storage device readable by computer and tangibly embodying a program of instructions executable by the computer to perform the above-described method of managing a data storage system.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, power consumption is a major issue for large storage systems, and important in general. The basic policy for adaptively powering up memory devices (e.g., disks) and data storage units (e.g., boxes) in data storage systems is described in U.S. Pat. No. 5,682,273 of Hetzler issued on Oct. 28, 1997 and incorporated herein by reference. However, currently, users must suffer a loss of performance to achieve significant power savings in a storage array by powering down disks (i.e., placing them in standby).

In view of the foregoing, disclosed herein are embodiments of an improved redundant data storage system (e.g., a symmetric redundant array of independent disks (RAID) system) and a method of operating such a redundant data storage system that provides significant power savings with minimal reduction in reliability. The system and method allow up to half of the memory devices in any of the memory arrays in the system to be placed in standby without significantly impacting the read accesses. The system and method further designate reserved areas in the active memory devices as write-journals, which have at least the same level of protection as the main arrays. The write-journals allow data to be written without powering up a standby memory device. Thus, power consumption is minimized with minimal impact on reliability.

Figure 1:
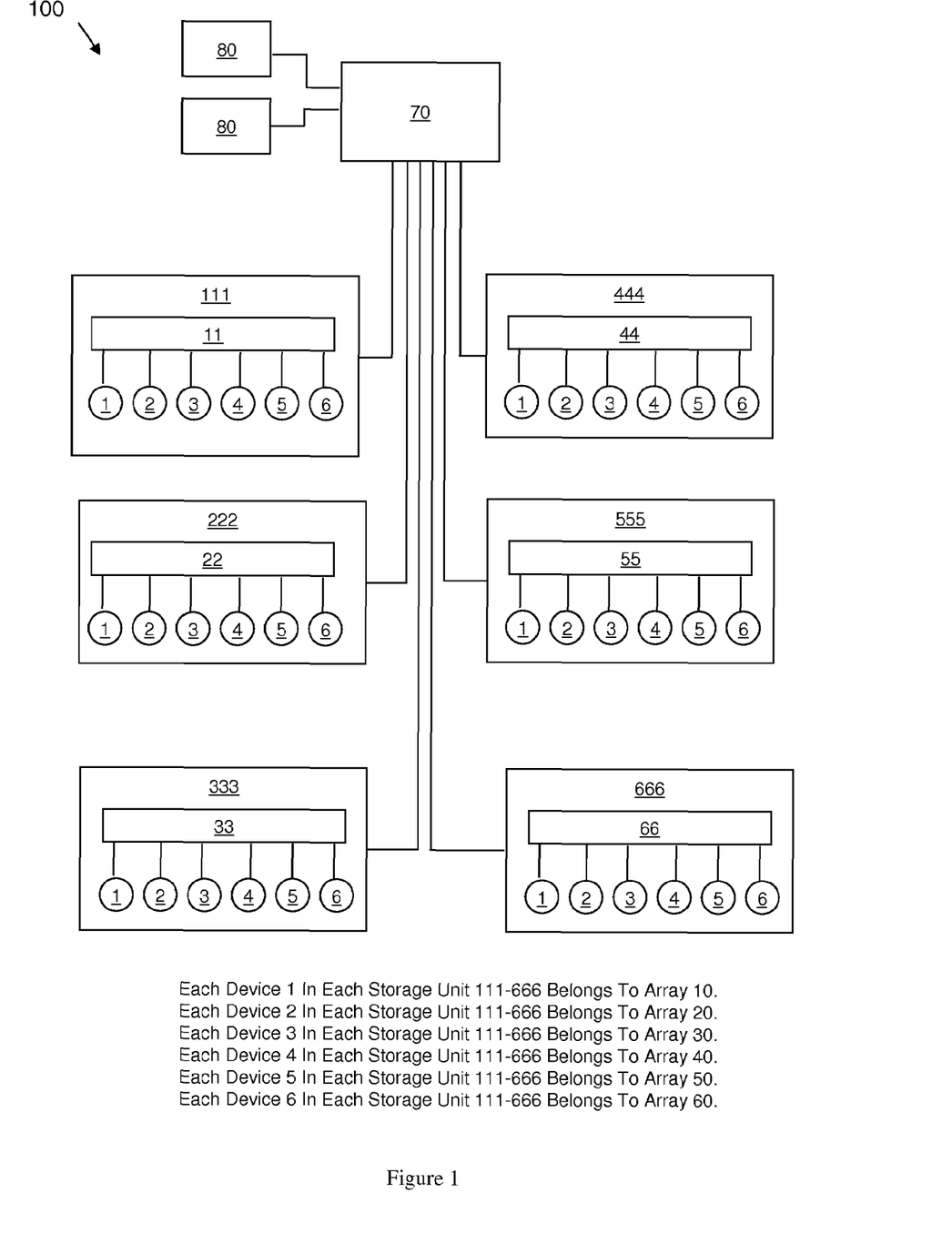
FIG. 1 is a schematic diagram illustrating an embodiment of a data storage system.

More particularly, referring to FIG. 1, disclosed herein are embodiments of a redundant data storage system 100 that comprises a plurality of arrays 10-60 each with corresponding memory devices 1-6. That is, all memory devices 1 belong to memory array 10, all memory devices 2 belong to memory array 20, etc. The memory devices in each array typically comprise hard disk drives (HDDs), but may also comprise other devices, for example, random access memory (RAM) devices, optical storage devices, magnetic tape storage devices, etc. Each of the memory devices in each of the arrays can comprise reserved storage space that is set aside specifically for write-journals. Such write-journals may be constructed using well-known techniques and at a minimum need only be created for memory devices entering the standby status, because new data may be written to active memory devices if those active memory devices are the target storage location for the data.

The system 100 can further comprise at least one controller 11-66 (e.g., one or more processors) adapted to (e.g., programmed to) control the memory devices 1-6 in each of the arrays 10-60, respectively. For example, the controller(s) 11-66 can be adapted to control reads from, writes to, and powering up and powering down of the memory devices. More specifically, the controller(s) 11-66 can be adapted to selectively control the memory devices such that at any given time up to half of the memory devices 1-6 in each of the arrays 10-60 comprise standby memory devices. That is, up to half of the devices 1-6 in each of the arrays 10-60 are powered down at any given time such that they are in a standby status. All other device (i.e., devices that are powered up) would comprise active memory devices. Devices that are powered up allow both read and write access.

The controller(s) 11-66 can further be adapted to associate the standby memory devices with corresponding write-journals on different memory devices and, more particularly, on active memory devices. The controller(s) 11-66 can also be adapted to receive new data from clients 80 (e.g., via an interface 70); to determine a target storage location for that new data; and, if the target storage location is one of the standby memory devices, then to write the new data to its corresponding write-journal.

The controller(s) 11-66 can further be adapted to power up each one of the standby memory devices and transfer new data from their corresponding write-journals to the target location (i.e., to flush the write-journals). Powering up each of the standby memory devices and transferring data out of write-journals can be periodically (e.g., every 10 minutes), intermittently, conditionally, on-demand (e.g., as directed by a user), etc. Conditional flushing of the write-journals can include but is not limited to, flushing a write-journal when a flag indicates that the write-journal is full or when the standby memory device is powered up due to performance requirements. Conditional flushing of write-journals can also include flushing a write-journal if read access to a standby memory device is requested (e.g., from a client 70) and a determination is made that the write-journal for that standby memory device contains new data. That is, the controller(s) 11-66 can be adapted to check a corresponding write-journal for new data if read access is requested to the standby memory device it is associated with and, if the corresponding write-journal does contain the new data, the controller(s) 11-66 can be adapted to power up the standby memory device and transfer the new data so that it can be read.

The controller(s) 11-66 can further be adapted to selectively control powering up and powering down of the memory devices in the different memory arrays 10-60 to allow for uniform aging.

The features of the above-described system 100 can be implemented, for example, in a symmetric redundant data storage system (e.g., a symmetric redundant array of independent disks (a symmetric RAID), as illustrated in U.S. patent application Ser. No. 10/619,648 of Hetzler et al., filed on Jul. 14, 2003, and incorporated herein by reference). Specifically, the system 100 can comprise multiple memory arrays (i.e., n memory arrays, such as six memory arrays 10-60). Each of the memory arrays 10-60 can comprise a same number n of memory devices (i.e., n devices in each of n memory arrays, such as, six devices in each of six memory arrays).

Additionally, the system 100 can comprise a plurality of storage units 111-666 (e.g., boxes). The number of storage units can be equal to or greater than the number n of memory arrays. For example, the system 100 can comprise 6 memory devices in each of 6 storage unit (i.e., a square matrix, as illustrated in FIG. 1), six devices in each of seven storage units (i.e., a non-square matrix), etc.

Each of these storage units 111-666 can comprise one controller 11-66, respectively, as well as one memory device 1-6 from each of the different memory arrays 10-60. That is, each memory array 10-60 can comprise one memory device in each storage unit 111-666. Thus, as illustrated in FIG. 1, the redundant storage system 100 can comprise, for example, six storage units arranged with six symmetric 3+3 arrays.

The controller 11-66 in each storage unit 111-666 can be adapted to communicate to all of the memory devices 1-6 in that storage unit as well as to an interface 70. This interface 70 can comprise a switching unit adapted to allow communication between any one of the controllers and any of the memory devices in any of the storage units (i.e., to provide a distributed network of controllers). This communication can be via an electrical connection (e.g., wires), wireless connection and/or some other means (e.g., logically connected software entities communicating over a socket layer). In the square matrix configuration of FIG. 1, this interface can be used to allow any one controller in any one storage unit can communicate with and control all of the memory devices in any single array or in multiple arrays. However, preferably, a single controller will control all of the memory devices belonging to a single array (e.g., controller 11 will be adapted to control all devices 1 in array 10; controller 22 will be adapted to control all devices 2 in array 20; etc.). In a non-square matrix (e.g., a matrix with six devices in each of seven storage units), this interface can allow any one controller to talk to one device in six storage units, leaving the $7^{th}$ storage unit untouched.

This interface 70 can further comprise a user interface (e.g., a graphical user interface) adapted to receive from, for example, clients 80, read and write access requests for data to be read from or stored in (i.e., written to) the memory devices of the system 100.

With a symmetric code over n memory devices, all the data may be recovered from any ½ n or more of the memory devices. Therefore, for power management up to half of the memory devices in each array can be placed in standby to reduce power, without requiring powering up of any memory devices to perform read operations. The read performance will be reduced however, as the number of active memory devices is halved, and reconstruction adds overhead for small reads. Specifically, the redundancy in such a symmetric system 100 can be used to ensure no or minimal impact on the read access to data already stored, even when up to half of the memory devices in any given array at any give time are powered down. That is, even if half of the devices in one, some or all of the memory arrays in the redundant system are placed in standby, any data that was stored redundantly in those memory arrays would still be readable on the three remaining active memory devices in those memory arrays.

However, as discussed above, the situation for handling writes is more involved. An important property of reliable storage arrays is that written data is protected against memory device loss. One option is to power up any required memory devices (i.e., to spin up required disks) to complete write operations. While such an approach is straightforward, it comes with a significant latency penalty (e.g., a typical 3.5" disk may need 10 seconds to spin up) and reduces the potential power savings. The present system 100 solves this write problem by designating reserved storage areas in sets of active memory devices into new write-journal arrays. This minimizes the impact of sporadic writes on power consumption, as they will be handled by the write-journal arrays. The write-journal arrays can be designed to have at least the same level of protection as the main arrays.

For example, in this 3+3 system reserved storage space for write-journals is provided on each of the memory devices 1-6 in each of the arrays 10-60, respectively. The write-journals can be configured in such a manner as to provide the same protection as if the memory devices they correspond to were fully operational. That is, the controllers 11-66 are adapted to associate each standby memory device with a corresponding write-journal on another different memory device so that if a target location for newly received data is one of the standby memory devices, then the new data can be written to its corresponding write-journal. The controllers 11-66 can be adapted to store, access and apply predetermined policies which are used to determine which memory devices are to be powered down (i.e., placed in standby) at any given time and also to associate each standby memory device with one corresponding write-journal on another different memory device. The policy used to place memory devices on standby and the policy used to associate standby memory devices with corresponding write-journals on active devices are interdependent. That is, the policy used to associate standby devices with write-journals on active devices must take into account, the manner in which up to half of the memory devices in the memory arrays are placed on standby and vice versa in order to avoid associating one standby memory device with a corresponding write-journal of another standby device and to limit sensitivity to storage unit and/or individual memory device losses.

For example, in a symmetric RAID system 100 embodiment of FIG. 1, the controllers 11-66 can be adapted to (e.g., can be programmed to) selectively power up and power down the memory devices 1-6 in each of the arrays 10-60, respectively, such that in each of the storage units 111-666 up to one half of the memory devices are on standby at any given time. In such a system, a predetermined powering-down policy can provide that memory devices 1-6 in each array 10-60 should be powered down on a rotational basis using a pattern (e.g., a diagonal pattern) which ensures that no two storage unit 111-666 will have memory devices from the same three arrays powered down at the same time. For example, referring to the table of FIG. 2, when the devices 1-3 of storage unit 111 are on standby (as indicated by the dash), devices 2-4 of unit 222, devices 3-5 of unit 333, etc. are also on standby. This pattern can rotate "diagonally", for example, such that during the next rotation devices 2-4 of unit 111 are on standby, devices 3-5 of unit 222 are on standby, etc. Rotation of standby devices can be periodically, intermittently, conditionally and/or on-demand.

Additionally, a predetermined association policy can provide that the standby memory devices (e.g., as indicated by the -) and the different memory devices on which their corresponding write-journals are located should be in different arrays and controlled by different controllers. That is, the selection of the write-journal ownership (i.e., which memory device in which array in which storage unit will contain the write-journal for a particular standby memory device) follows the rule that the write-journal for a given disk must be on a different controller and in a different array. An exemplary pattern which meets this criteria can include one in which the memory device number for a write-journal can be chosen to be 1 greater with wrap than the standby device number (e.g., a standby disk 1 will have a write-journal on an active disk 2) and the storage unit number containing the write-journal for a standby device can be chosen to be 4 greater with wrap than the storage unit of the standby device (e.g., a disk from storage unit 111 that is on standby will have a write-journal on a disk in storage unit 555). For example, as illustrate in the table of FIG. 2, memory device 1 in storage unit 111 (owned by array 10) is spun down (i.e., on standby). New writes to this device 1 in unit 111 will go to the write-journal on device 2 in storage unit 5. The other memory devices in array 1 are handled similarly. That is, writes to memory device 1 of array 10 in unit 555 goes to a write-journal created in unit 333, device 2; writes to memory device 1 of array 10 in unit 666 go to a write-journal in unit 444, device 2. Thus, write protection is very strong. That is, the system can tolerate the simultaneous loss of any 3 of {(111,1), (222,1), (333,1),(444,1),(555, 1),(666,1)}, and still recover all the data for array 10.

Figure 2:
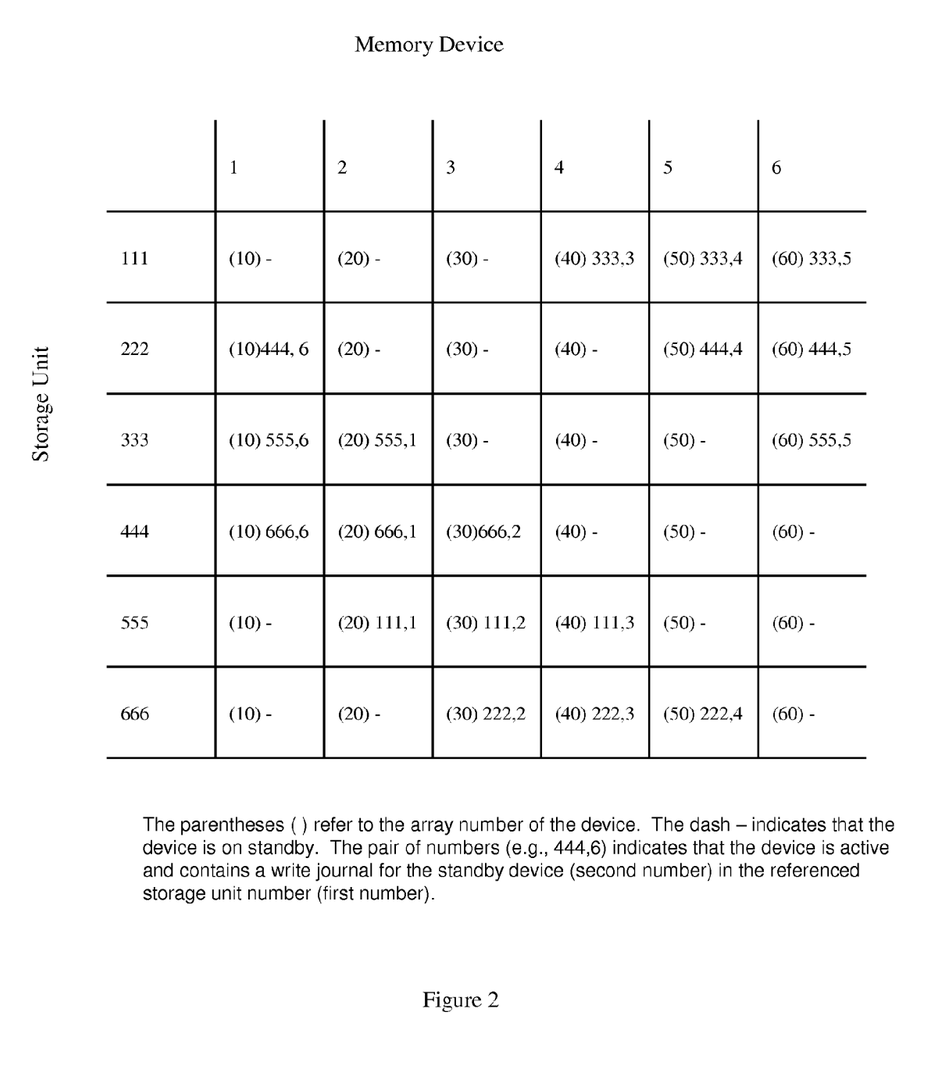
FIG. 2 is a table illustrating an exemplary configuration for standby memory devices and corresponding write-journals.

However, with this pattern, there is a set of 3 memory devices from array 10 whose loss (i.e., whose placement in standby) creates a simultaneous loss of 3 write-journals from array 60, thereby, making array 60 vulnerable to further memory device loss. The same holds true for all the arrays in this configuration. Additionally, if storage unit 111 is lost for some reason, all of the associated memory devices on the storage unit will also be lost, including memory device 3 in storage unit 111, which belongs to array 30, and memory device 4 in storage unit 111, which contains the write-journal for standby memory device 3 in storage unit 333, which also belongs to array 30. Thus, two independent components for array 30 would be lost with a single storage unit loss.

Therefore, alternatively, the predetermined association policy can provide that each memory array can host no more than one write-journal from any other memory array and that each standby memory device and the different memory device on which its corresponding write-journal is located should be within the same storage unit and, thus, controlled by the same controller. That is, it is possible to eliminate both of the problems associated with the pattern discussed above. Specifically, to minimize the sensitivity to memory device loss, a pattern which ensures that an array hosts no more than one write-journal from any other arrays should be used. Additionally, to minimize sensitivity to storage unit loss, the pattern should also ensure that the write-journals are hosted in the same storage unit as the standby memory devices. Thus, the loss of a single storage unit will result in the loss of two dependent memory devices from each array, which is as if no write-journal was used, but all the data was written to the originally targeted memory device. Thus, the box loss tolerance is unaffected.

Figure 3:
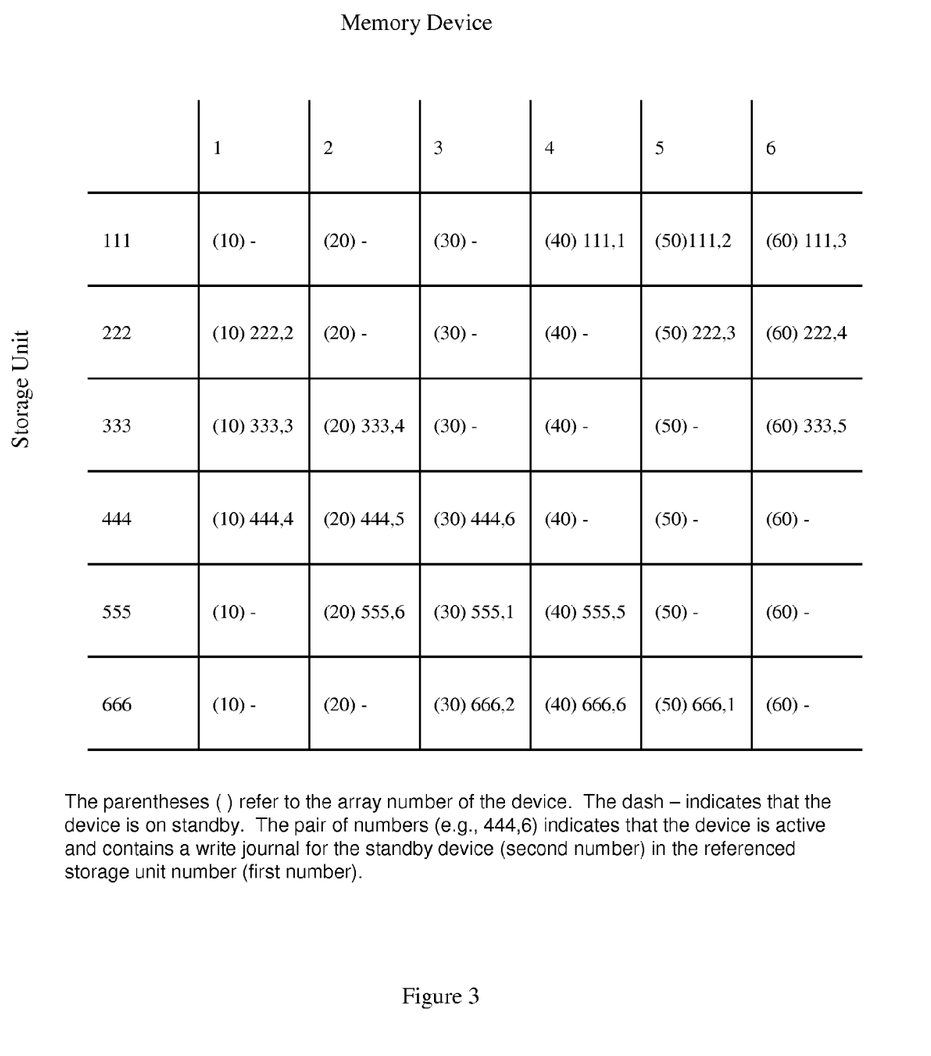
FIG. 3 is a table illustrating another exemplary configuration for standby memory devices and corresponding write-journals.

Referring to FIG. 3, an exemplary algorithm that may be used to implement this pattern when associating write-journals with standby devices can comprise: (1) limit the write-journals for standby memory devices in a storage unit to active devices also contained within that storage unit; (2) start with a sequence of memory devices in order in the storage unit; and (3) adjust the memory device numbers by right-symmetric rotation in sequential boxes (i.e., for right-symmetric power down configuration). Therefore, starting with storage unit 111, the powered down memory devices are 1, 2 and 3 and so the set of write-journals will be created on the remaining memory devices in storage unit 111 (i.e., memory devices 4, 5 and 6 in storage unit 111). These write-journals are assigned in sequential order to the memory devices, as shown (e.g., the write-journal for memory device 1 of unit 111 is assigned to memory device 4 of unit 111, the write-journal for memory device 2 of unit 111 is assigned to memory device 5 of unit 111, etc.). Similarly, for storage unit 222, the set of powered down devices are 2, 3 and 4 the corresponding set of write-journals for those standby devices are on devices 5, 6 and 1, respectively. The assignments for the remaining boxes proceed similarly. Thus, the standby devices and their corresponding write-journals are in the same storage unit and no array hosts more than one device from any other array.

The difference in failure pattern sensitivity is readily apparent. That is, losing three memory devices of array 10, such as device 1 in each of the storage units 222, 333 and 444 results in the loss of the write-journals on device 2 of storage unit 222, device 3 of storage unit 333 and device 4 of storage unit 444. Thus, the loss of data in any of those arrays (i.e., arrays 20, 30 and 40) requires the loss of two additional memory devices from one of them. Consequently, there are no patterns where a loss of four memory devices from more than one array, each containing six memory devices, can cause data loss. Loss of four memory devices from one six-device array will, but this is the same as the base situation. Further, the loss of storage unit 111 loses one memory device from each of the arrays 10-60. It also loses the write-journals for one disk in arrays 10, 20 and 30. Thus, the situation is no different than that for the situation with no disks powered down.

In an alternative symmetric RAID system 100 embodiment, the controllers 11-66 can be adapted to (e.g., can be programmed to) selectively power up and power down entire storage units 111-666, including both the memory devices and the controller contained therein, such that half of the storage units 111-666 and, therefore, half of all the memory devices 1-6 in each array 10-60, respectively, are on standby at any given time. For example, as illustrate in FIG. 4, storage units 111, 222 and 333 can be powered down such that three memory devices from each array 10-60 are on standby. In such a system, a predetermined powering down policy can provide that the storage units should be powered down on a rotational basis (e.g., power down storage units 111, 222 and 333, then power down 222, 333 and 444, etc.). This rotation can be periodically, intermittently, conditionally, and/or on-demand.

Figure 4:
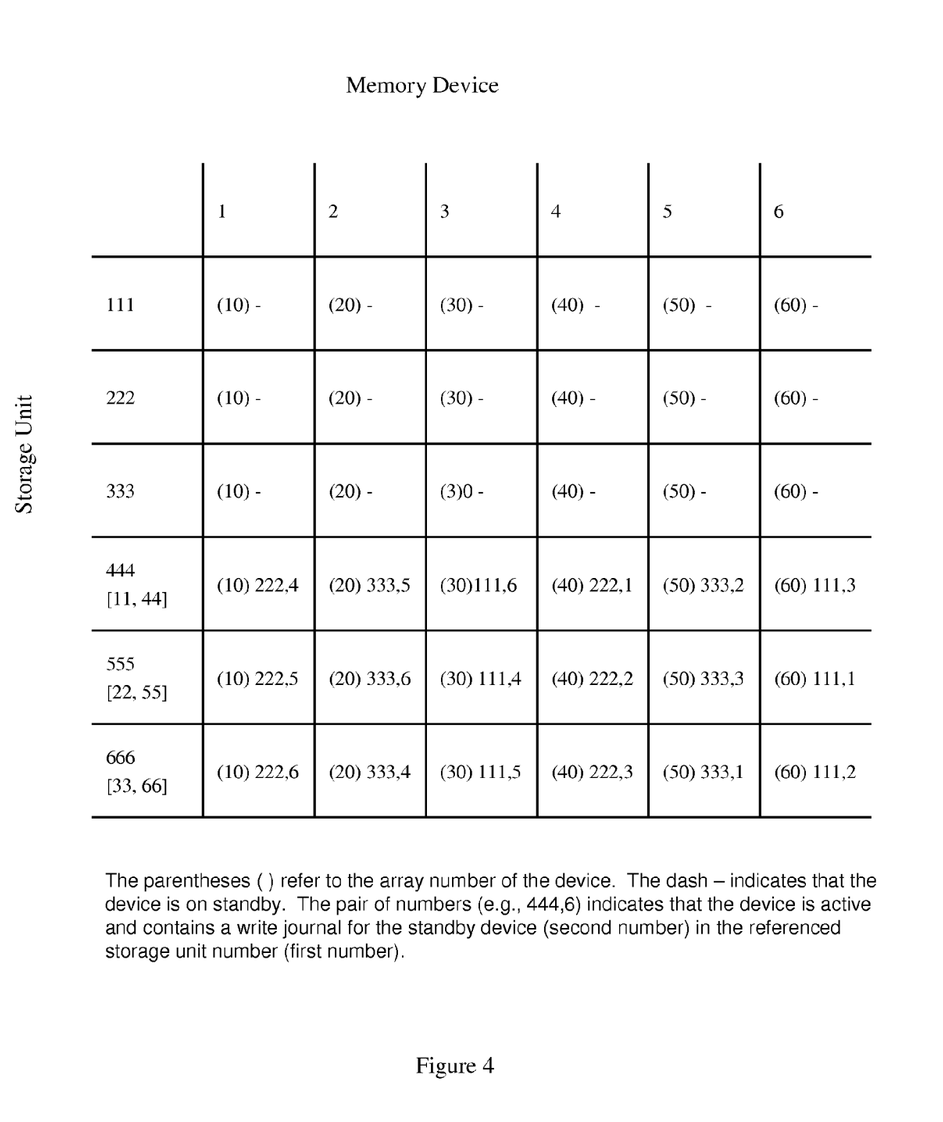
FIG. 4 is a table illustrating another exemplary configuration for standby memory devices and corresponding write-journals.

Additionally, referring to FIG. 4, a predetermined association policy can provide that the corresponding write-journals for the standby memory devices in each storage unit 111-666 that is powered down should be dispersed (e.g., approximately equally) amongst the memory devices in the active storage units and can further provide that each standby memory device and the different memory device on which its corresponding write-journal is located are in different arrays. This pattern is tolerant of three simultaneous drive failures or one box failure. Also, as illustrated in FIG. 4, with this embodiment one storage unit must take the role of two controllers and assignment of which storage units will do so can be sequential. For example, when storage units 111, 222 and 333 are powered down, the controllers 44, 55 and 66 in storage units 444, 555 and 666 will take over the functions of controllers 11, 22 and 33, respectively. This situation requires a full set of working drives in each of the active storage devices, and the data must be recoverable from the appropriate number of powered down disks (depending on the failure circumstances).

Figure 5:
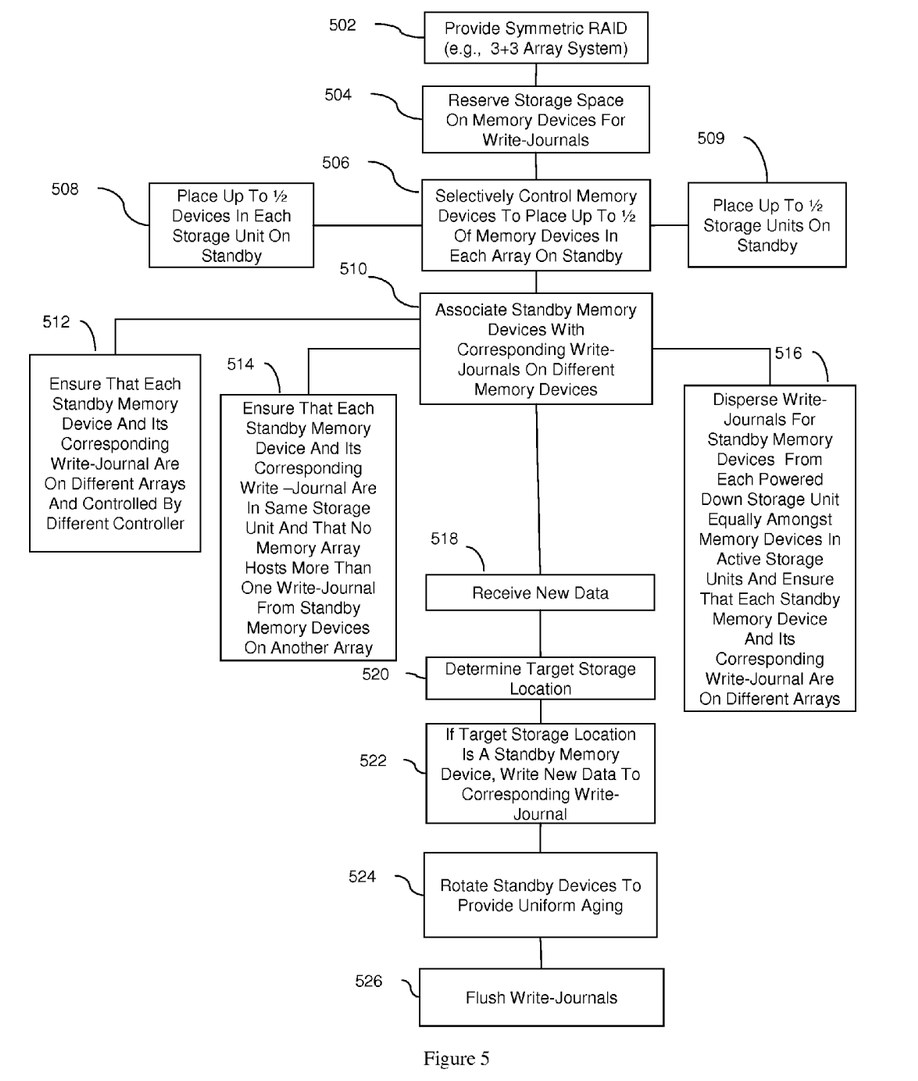
FIG. 5 is a flow diagram illustrating an embodiment of the method of the invention.

Referring to FIG. 5, also disclosed are embodiments of a method of managing a data storage system 100 such as the one described above (502). More specifically, the embodiments of the method comprise selectively controlling memory devices in a plurality of memory arrays such that at any given time up to half of the memory devices are powered down (i.e., comprise standby memory devices) and the remainder are powered up (i.e., to comprise active memory devices) (506). This process of selectively controlling the memory devices can further comprise selectively controlling powering up and powering down of the memory devices to allow for uniform aging (524).

Additionally, the method comprises reserving storage space for write-journals in each of the memory devices (50) and associating the standby memory devices with corresponding write-journals on different memory devices based on a predetermined policy (510). This predetermined policy takes into consideration the manner in which up to half of the memory devices in each array are powered down to avoid associating a standby memory device with a write-journal on another standby memory device and to ensure minimal sensitivity to storage unit and/or individual memory device losses.

For example, in one method embodiment the redundant storage system being managed can comprise a symmetric RAID system 100, as discussed above, and the memory devices can be selectively powered up and powered down such that in each storage unit that contains one of the memory devices from each of the arrays up to half of the memory devices are on standby at any given time (508). With such a method embodiment, each of the standby memory devices should be associated with corresponding write-journals in a manner that ensures that the standby memory devices are in different arrays and controlled by different controllers than the different memory devices which contain the corresponding write-journals (512) (see detailed discussion above). Alternatively, the standby memory devices should be associated with corresponding write-journals in a manner that ensures that each of the memory arrays contain no more than one write-journal from any other memory array and that the standby memory devices are in the same storage units with the different memory devices which contain their corresponding write-journals (514) (see detailed discussion above).

In another method embodiment, the storage system being managed can similarly comprise a symmetric RAID system 100, as discussed above, but in this embodiment the storage units which contain one of the memory devices from each of the memory arrays can be selectively powered down such that up to half of the storage units and, thereby, up to half of the memory devices in any given memory array are on standby at any given time (509). With such a method embodiment, each standby memory device can be associated with one corresponding write-journal on another memory device in such a way that ensures that the corresponding write-journals for the standby memory devices in each storage unit that is powered down are dispersed (e.g., approximately equally) amongst the memory devices in the active storage units and further that each standby memory device and the different memory device on which its corresponding write-journal is located are in different arrays (516) (see detailed discussion above).

Then, as new data is received by the redundant storage system 100 (518), a target storage location within the storage system for the new data is determined (520). If the target storage location is one of the standby memory devices, then the new data is written to the corresponding write-journal for that standby memory device (522).

The method embodiments can further comprise periodically, intermittently, on-demand, or conditionally powering up each of the standby memory devices and transferring any new data from the corresponding write-journals to their target storage locations (i.e., flushing the write-journals) (526). Powering up each of the standby memory devices and transferring data out of write-journals can be periodically (e.g., every 10 minutes), intermittently, conditionally, on-demand (e.g., as directed by a user), etc. Conditional flushing of the write-journals can include but is not limited to, flushing a write-journal when a flag indicates that the write-journal is full or when the standby memory device is powered up due to performance requirements. Conditional flushing of write-journals can also include flushing a write-journal if read access to a standby memory device is requested (e.g., from a client 70) and a determination is made that the write-journal for that standby memory device contains new data.

Additionally, the process of selectively controlling the memory devices can further comprise selectively controlling powering up and powering down of the memory devices to allow for uniform aging (524). This can be accomplished, for example, by sequentially rotating the memory devices in each storage unit or the storage units themselves into standby depending upon whether method steps 508 or 509 are used. Specifically, if method step 508 is used than a diagonal pattern can be used to rotate the memory devices within each storage unit in and out of standby. That is, as illustrated in FIGS. 2 and 3, when memory devices 1, 2 and 3 in storage unit 111 are placed on standby, memory devices 2, 3 and 4 in storage unit 222, memory devices 3, 4 and 5 in storage unit 333, etc., are also placed on standby. In the next rotation, memory devices 2, 3 and 4 of storage unit 111, memory devices 3, 4, and 5 of storage unit 222, etc., can simultaneously be placed on standby. Alternatively, if method step 509 is used, then the storage units can be sequentially rotated in and out of standby. That is, as illustrated in FIG. 4, storage units 111, 222 and 333 are on standby. Then, in the next rotation storage units 222, 333, and 444 can be placed on standby, etc.

As discussed above, the basic policy for adaptively powering memory devices (e.g., disks) and storage units can be based on energy budgeting as described in U.S. Pat. No. 5,682,273. This method can be improved upon for this application. The performance weighting factor includes the reduced access performance when disks are spun down. However, recovery from the low-power state is not required for all accesses. The recovery policy for write accesses should include the estimated time to fill the write-journal and the estimated time to spin up the disks. If write accesses are sporadic, it may be beneficial to leave the disks spun down until the time left to fill the write-journal is close to the spin up time. This is to be balanced against the energy penalty for spinning up. Furthermore, it may be beneficial to periodically alter the set of disks that are spun down, to even out the wear patterns.

The embodiments of the invention can take the form of an entirely hardware embodiment, an entirely software embodiment or an embodiment including both hardware and software elements. In one embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system (e.g., a program storage device readable by computer and tangibly embodying a program of instructions executable by the computer to perform the above-described method of managing a data storage system). For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
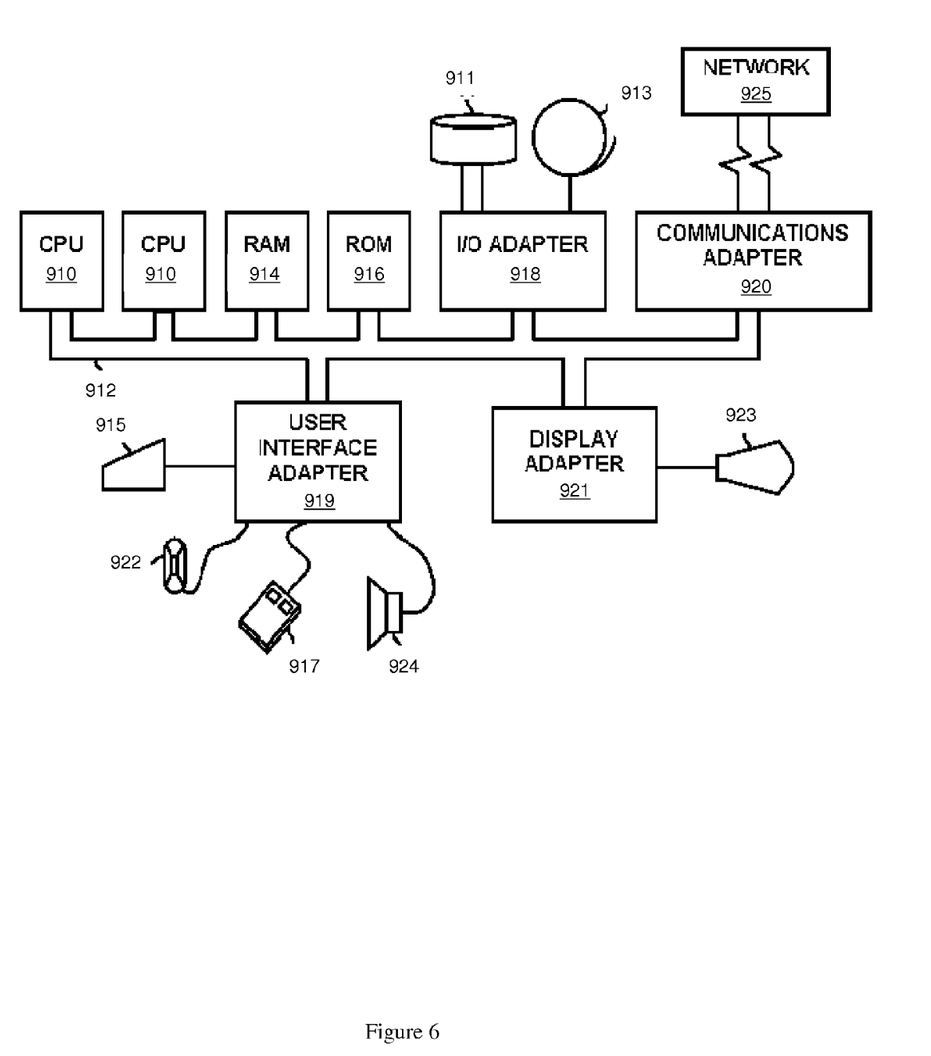
FIG. 6 is a schematic representation of a computer system suitable for use in data storage management as described herein.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 910. The CPUs 910 are interconnected via system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system. The system can read the inventive instructions on the program storage devices and follow these instructions to execute the methodology of the embodiments of the invention. The system further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network 925, and a display adapter 921 connects the bus 912 to a display device 923 which may be embodied as an output device such as a monitor, printer, or transmitter, for example.

Therefore, disclosed above are embodiments of an improved redundant data storage system (e.g., a symmetric redundant array of independent disks (RAID) system) and a method of operating such a redundant data storage system that provides significant power savings with minimal reduction in reliability. The system and method allow up to half of the memory devices in any of the memory arrays in the system to be placed in standby without significantly impacting the read accesses. The system and method further designate reserved areas in the active memory devices as write-journals, which have at least the same level of protection as the main arrays. The write-journals allow data to be written without powering up a standby memory device. Thus, power consumption is minimized without impacting reliability.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of managing a data storage system, said method comprising:
providing said data storage system, said data storage system comprising multiple memory devices in multiple storage units such that each storage unit comprises n memory devices and each memory device in each storage unit belongs to a different one of n memory arrays and comprises one of a hard disk drive, a random access memory device, an optical storage device and a magnetic tape storage device, wherein said n memory arrays comprise symmetric redundant arrays and wherein n is a number greater than 1;
selectively controlling powering up and powering down of said multiple memory devices, wherein said selectively controlling comprises:
at any given time powering down up to half of said multiple memory devices so as to form standby memory devices and activate memory devices; and
applying a symmetric code over said multiple memory devices so that all data redundantly stored in said multiple memory devices may be recovered from said active memory devices without accessing said standby memory devices; reserving storage space for write-journals in said multiple memory devices;
associating said standby memory devices with corresponding write-journals on said active memory devices;
providing said corresponding write-journals with a same level of protection as said standby memory devices;
receiving new data;
determining a target storage location for said new data;
if said target location is one of said standby memory devices, writing said new data to a corresponding write-journal for said standby memory devices; and,
powering back on said one of said standby memory devices and transferring said new data out of said corresponding write-journal and into said target storage location, said powering back on is performed one of on-demand, conditionally, and periodically,
wherein said associating comprises one of the following:
associating said standby memory devices with said corresponding write-journals such that each particular write-journal is associated with only one particular standby memory device and further such that an active memory device containing said particular write-journal is in a different storage unit as said particular standby memory device and is controlled by a different controllers than said particular standby memory, and
associating said standby memory devices with said corresponding write-journals such that each particular write-journal is associated with only one particular standby memory device, such that as active memory device containing said particular write-journal is in a same storage unit as said particular standby memory device and such that each of said n memory arrays contains no more than one write-journal from any others of said n memory arrays.

2. A method of managing a data storage system, said method comprising:
providing said data storage system, said data storage system comprising multiple memory
devices in multiple storage units such that each storage unit comprises n memory devices and each memory device in each storage unit belongs to a different one of n memory arrays and comprises one of a hard disk drive, a random access memory device, an optical storage device and a magnetic tape storage device, wherein said n memory arrays comprise symmetric redundant arrays and wherein n is a number greater than 1;

selectively controlling powering up and powering down of said multiple memory devices, wherein said selectively controlling comprises:

at any given time powering down half of said multiple memory devices so as to form standby memory devices and active memory devices; and applying a symmetric code over said multiple memory devices so that all data redundantly stored in said multiple memory devices may be recovered from said active memory devices without accessing said standby memory devices;

reserving storage space for write-journals in said multiple memory devices;

associating said standby memory devices with corresponding write-journals on said active memory devices;

providing said corresponding write-journals with a same level protection as said standby memory devices;

receiving new data; determining a target storage location for said new data;

if said target is one of said standby memory devices, writing said new data to a corresponding write-journal for said one of said standby memory devices; and powering back on said one of said standby devices and transferring said new data out of said corresponding write-journal and into said target storage location, said powering back on of is performed one of on-demand, conditionally, and periodically, wherein said selectively controlling of said powering up and powering down of said multiple memory devices comprises selectively powering up and powering down different ones of said multiple memory devices such that in each storage unit half of said n memory devices are in standby at any given time, and wherein said associating comprises one of the following:

associating said standby memory devices with said corresponding write-journals such that each particular write-journal is associated with only one particular standby memory device and further such that an active memory device containing said particular write-journal is in a different storage unit as said particular standby memory device and is controlled by a different controllers than said particular standby memory, and associating said standby memory devices with said corresponding write-journals such that each particular write-journal is associated with only one particular standby memory device, such that as active memory device containing said particular write-journal is in a different storage unit as said particular standby memory device and is controlled by a different controllers than said particular standby memory, and associating said standby memory devices with said corresponding write-journals such that each particular write-journal is associated with only one particular standby memory device, such that an active memory device containing said particular write-journal is in a same storage unit as said particular standby memory device and such that each of said n memory arrays contains no more than one write-journal from an others of said n memory arrays.

3. A method of managing a data storage system, said method comprising:

providing said data storage system, said data storage system comprising multiple memory devices in multiple storage units such that each storage unit comprises n memory devices and each memory device in each storage unit belongs to a different one of n memory arrays and comprises one of a hard disk drive, a random access memory device, an optical storage device and a magnetic tape storage device, wherein said n memory arrays comprise symmetric redundant arrays and wherein n is a number greater than 1;

selectively controlling powering up and powering down of said multiple memory devices, wherein said selectively controlling comprises:

at any given time powering down half of said multiple memory devices so as to form standby memory devices and active memory devices; and applying a symmetric code over said multiple memory devices so that all data redundantly stored in said multiple memory devices may be recovered from said active memory devices without accessing said standby memory devices;

reserving storage space for write-journals in said multiple memory devices;

associating said standby memory devices with corresponding write-journals on said active memory devices;

providing said corresponding write-journals with a same level protection as said standby memory devices;

receiving new data; determining a target storage location for said new data; and if said target is one of said standby memory devices, writing said new data to a corresponding write-journal for said one of said standby memory devices; and powering back on said one of said standby devices and transferring said new data out of said corresponding write-journal and into said target storage location, said powering back on of is performed one of on-demand, conditionally, and periodically, wherein said selectively controlling of said powering up and powering down of said multiple memory devices comprises selectively powering up and powering down of said multiple storage units such that, at any given time, half of said multiple units ate powered down causing half of said n memory devices in each of said n arrays to be on standby, and wherein said associating comprises associating said standby memory devices with said corresponding write-journals such that each particular write-journal is associated with only one particular standby memory device and such that an active memory device containing said particular write-journal is in a different storage unit as said particular standby memory device and is controlled by a different controllers than said particular standby memory.

* * * * *